(12) United States Patent
Miyamoto et al.

(10) Patent No.: US 7,271,235 B2
(45) Date of Patent: Sep. 18, 2007

(54) BRANCHED AROMATIC POLYCARBONATE AND ITS PRODUCTION METHOD

(75) Inventors: Masaaki Miyamoto, Kitakyushu (JP); Takao Tayama, Kitakyushu (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/633,672

(22) Filed: Aug. 5, 2003

(65) Prior Publication Data

US 2004/0024168 A1 Feb. 5, 2004

Related U.S. Application Data

(63) Continuation of application No. PCT/JP02/00793, filed on Jan. 31, 2002.

(30) Foreign Application Priority Data

Feb. 6, 2001 (JP) .............................. 2001-029951

(51) Int. Cl.
*C08G 64/00* (2006.01)
(52) U.S. Cl. .................. 528/204; 528/176; 528/193; 528/194; 528/196; 528/198
(58) Field of Classification Search ................ 528/176, 528/193, 194, 196, 198, 204
See application file for complete search history.

(56) References Cited

U.S. PATENT DOCUMENTS

| 4,562,242 | A | 12/1985 | Mark et al. |
| 5,948,876 | A * | 9/1999 | Mestanza et al. ............ 528/196 |
| 6,166,167 | A | 12/2000 | Miyamoto et al. |
| 6,262,210 | B1 * | 7/2001 | Tojo et al. .................. 526/270 |
| 6,288,205 | B1 | 9/2001 | Miyamoto et al. |
| 6,294,641 | B1 | 9/2001 | Miyamoto et al. |

FOREIGN PATENT DOCUMENTS

| EP | 0 736 561 | 10/1996 |
| JP | 8-245465 | 9/1996 |
| JP | 2000-53759 | 2/2000 |
| JP | 2003-26913 | * 1/2003 |
| WO | WO 00/47679 | 8/2000 |

OTHER PUBLICATIONS

Database WPI, Section Ch, Week 200047, Derwent Publications Ltd., London, GB; AN 2000-516738, XP002310276, & JP 2000 159880 A (Mitsubishi Gas Chem Co. Inc.) Jun. 13, 2000 "Abstract".
Supplementary European Search Report.
Chemiacl Handbook, Applied Chemistry Process; complied by Chemical Society of Japan; Maruzen Co., Ltd.; Published Oct. 15, 1986, p. 603. (with translation of relevant portion).

* cited by examiner

*Primary Examiner*—Terressa Boykin
(74) *Attorney, Agent, or Firm*—Oblon, Spivak, McClelland, Maier & Neustadt, P.C.

(57) ABSTRACT

It is to provide a branched aromatic polycarbonate excellent in hue and excellent in melt properties such as melt strength.

A branched aromatic polycarbonate obtained by transesterification and having a viscosity average molecular weight of at least 16,000, wherein the amount of structural units of the following formula (1) contained in its main chain is within a range of from 2,000 to 50,000 wtppm, and the amounts of structural units of the following formulae (2) and (3) contained in its main chain are within a range of from 30 to 10,000 wtppm, respectively:

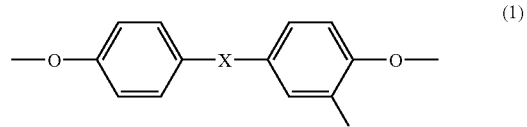

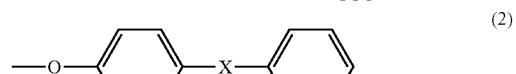

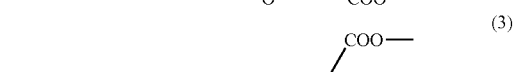

48 Claims, No Drawings

BRANCHED AROMATIC POLYCARBONATE AND ITS PRODUCTION METHOD

TECHNICAL FIELD

The present invention relates to a branched aromatic polycarbonate excellent in quality and its production method. More particularly, it relates to a branched aromatic polycarbonate having improved melt properties and further having improved hue and residence stability, and its production method.

BACKGROUND ART

Production of an aromatic polycarbonate by polycondensation of an aromatic dihydroxy compound and a carbonic acid diester, so-called transesterification is not only relatively simple as compared with a phosgene method (interfacial polymerization method) and is superior in view of operation and cost, but also revaluated in recent years from the viewpoint of environmental protection since no halogen type solvent such as phosgene or methylene chloride which is highly toxic is used.

However, the transesterification has several drawbacks in view of physical properties as compared with the phosgene method, and thus it is scarcely employed as a large scale industrial process. A polycarbonate obtained by the transesterification, as a representative example, has such problems that branches are likely to form, fluidity and moldability tend to decrease, and it is poor in hue of the product, as compared with a product obtained by the phosgene method.

Several proposals have been made to overcome these problems. For example, a method for obtaining an aromatic polycarbonate excellent in hue, hue stability and heat stability at the time of molding, by making the contents of an isomer and a derivative in the aromatic dihydroxy compound used as a material to be within specific ranges (JP-A-8-104747, JP-A-8-104748, JP-A-8-277236), a method for obtaining a polycarbonate having less branches, by making the phenoxybenzoic acid content in the main chain to be a specific amount with a specific catalyst under a specific reaction condition (JP-A-7-18069, JP-A-8-109251, JP-A-9-278877), or a method for obtaining a less colored polycarbonate by making the p-hydroxyacetophenone content to be at most a specific amount (JP-A-8-27263) may, for example, be mentioned. Such methods are methods proposed to overcome conventional problems and to decrease formation of branches and to improve the hue.

On the other hand, a commonly employed aromatic polycarbonate has a linear molecular structure, and a polycarbonate having such a molecular structure may be poor in e.g. melt elasticity and melt strength at the time of melt molding, and their improvements have been desired. Actually, as a method for improving melt properties such as melt elasticity and melt strength of such a polycarbonate, a method for branching a polycarbonate by an interfacial polymerization method by using a polyfunctional compound such as 1,1,1-tris(4-hydroxyphenyl)ethane (THPE) or 1,3,5-tris(4-hydroxyphenyl)benzene as a branching agent together with 2,2-bis(4-hydroxydiphenyl)propane (hereinafter referred to simply as "bisphenol A" or "BPA") has conventionally been known (JP-B-44-17149, JP-B-47-2918, JP-A-2-55725, JP-A-4-89824).

However, an aromatic polycarbonate has a high melt viscosity even if it has a linear structure, and further, a polycarbonate having a branched structure introduced by copolymerization with a polyfunctional compound has a higher melt viscosity and a decreased fluidity. Of such a polycarbonate having a high melt viscosity and being poor in fluidity, the molding conditions may be limited, or molding unevenness occurs, whereby it is difficult to stably obtain a uniform molded product.

In order to overcome these problems, various attempts have been done on a melt polymerization method employing a carboxylic acid diester and an aromatic dihydroxy compound, however, a branching agent may undergo e.g. decomposition at a high temperature, whereby no effect of branching is obtained, and further, it may cause coloring, and accordingly no satisfactory results have been obtained (JP-A-4-89824, JP-A-6-136112, JP-B-7-37517, JP-B-7-116285).

The present invention is to provide a method for producing a branched aromatic polycarbonate excellent in quality. More particularly, it is to provide a branched aromatic polycarbonate having improved melt properties and further having improved hue and residence stability, and a method for producing such a branched aromatic polycarbonate efficiently.

DISCLOSURE OF THE INVENTION

The present inventors have conducted extensive studies to provide a branched aromatic polycarbonate excellent in hue and excellent in melt properties such as melt strength, and as a result, found that a branched aromatic polycarbonate having specific structural units in its main chain in a specific amount has an improved fluidity under a high load, and has improved hue and residence stability. The present invention has been accomplished on the basis of these discoveries.

Namely, the present invention provides a branched aromatic polycarbonate obtained by transesterification and having a viscosity average molecular weight of at least 16,000, wherein the amount of structural units of the following formula (1) contained in its main chain is within a range of from 2,000 to 50,000 wtppm, and the amounts of structural units of the following formulae (2) and (3) contained in its main chain are within a range of from 30 to 10,000 wtppm, respectively:

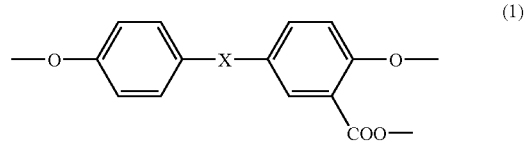

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —$SO_2$—,

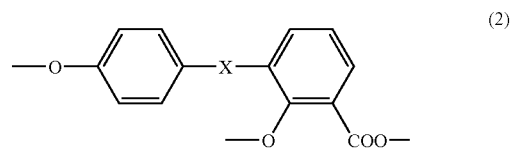

-continued

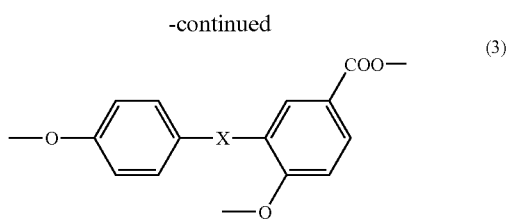

(3)

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —SO$_2$—.

The present invention further provides a method for producing the branched aromatic polycarbonate as defined in any one of claims 1 to 6, which comprises reacting a carbonic acid diester with an aromatic dihydroxy compound to produce an aromatic polycarbonate, wherein an aromatic dihydroxy compound containing a 2,4'-bisphenol compound of the following formula (6) in an amount of from 100 to 50,000 wtppm is used:

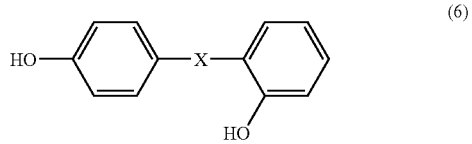

(6)

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —SO$_2$—.

BEST MODE FOR CARRYING OUT THE INVENTION

Now, the present invention will be explained in detail below.

Method for Producing an Aromatic Polycarbonate

The aromatic polycarbonate of the present invention can be obtained by melt polycondensation by using an aromatic dihydroxy compound and a carbonic acid diester as materials in the presence of a transesterification catalyst.

Carbonic Acid Diester

The carbonic acid di-ester used in the present invention is represented by the following formula (7):

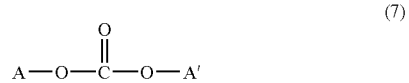

(7)

wherein each of A and A' is a $C_{1-18}$ aliphatic group or a substituted aliphatic group, or an aromatic group or a substituted aromatic group, and A and A' may be the same or different.

The carbonic acid diester of the above formula (7) may, for example, be a dialkyl carbonate compound such as dimethyl carbonate, diethyl carbonate or di-t-butyl carbonate, diphenyl carbonate or a substituted diphenyl carbonate such as ditolyl carbonate. Preferred is diphenyl carbonate or a substituted diphenyl carbonate, particularly preferred is diphenyl carbonate. Such carbonic acid diesters may be used alone or as a mixture of at least two.

Aromatic Dihydroxy Compound

The aromatic dihydroxy compound used in the present invention is usually represented by the following formula (8), and two aromatic rings are bonded by a binding group X and a hydroxyl group is bonded at each of 4-positions relative to X in the aromatic rings. In the present specification, the aromatic dihydroxy compound of the formula (8) will sometimes be referred to as "4,4'-bisphenol compound":

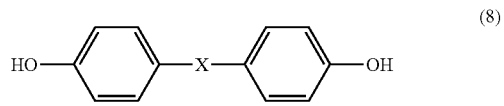

(8)

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —SO$_2$—.

The aromatic dihydroxy compound of the above formula (8) may, for example, be a bisphenol such as bisphenol A, bis(4-hydroxydiphenyl)methane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromophenyl)propane, 4,4-bis(4-hydroxyphenyl)heptane or 1,1-bis(4-hydroxyphenyl)cyclohexane; a biphenol such as 4,4'-dihydroxybiphenyl, 3,3',5,5'-tetramethyl-4,4'-dihydroxybiphenyl; bis(4-hydroxyphenyl)sulfone, bis(4-hydroxyphenyl)sulfide, bis(4-hydroxyphenyl)ether or bis(4-hydroxyphenyl)ketone. Particularly preferred is bisphenol A. Such dihydroxyaryl compounds may be used alone or as a mixture of at least two.

For production of the aromatic polycarbonate in the present invention, usually bisphenol A is used as the aromatic dihydroxy compound, and diphenyl carbonate is used as the carboxylic acid diester. Diphenyl carbonate is used in an amount of from 1.01 to 1.30 mol, preferably from 1.02 to 1.20 per 1 mol of the bisphenol A.

Transesterification Catalyst

In the present invention, as the transesterification catalyst, an alkali metal compound and/or an alkaline earth metal compound is used. A basic compound such as a basic boron compound, a basic phosphorus compound, a basic ammonium compound or an amine type compound may be used together supplementary, but it is particularly preferred to use an alkali metal compound and/or an alkaline earth metal compound alone.

The alkali metal compound may, for example, be sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, phenylated sodium boron, phenylated potassium boron, phenylated lithium boron, phenylated cesium boron, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, an alcoholate or a phenolate of sodium, potassium, lithium or cesium, or disodium salt, dipotassium salt, dilithium salt or dicesium salt of bisphenol A.

The alkaline earth metal compound may, for example, be calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate or strontium stearate.

Specific examples of the basic boron compound include sodium salt, potassium salt, lithium salt, calcium salt, barium salt, magnesium salt and strontium salt of tetramethyl boron, tetraethyl boron, tetrapropyl boron, tetrabutyl boron, trimethylethyl boron, trimethylbenzyl boron, trimethylphenyl boron, triethylmethyl boron, triethylbenzyl boron, triethylphenyl boron, tributylbenzyl boron, tributylphenyl boron, tetraphenyl boron, benzyltriphenyl boron, methyltriphenyl boron or butyltriphenyl boron.

The basic phosphorus compound may, for example, be triethylphosphine, tri-n-propylphosphine, triisopropylphosphine, tri-n-butylphosphine, triphenylphosphine, tributylphosphine or a quaternary phosphonium salt.

The basic ammonium compound may, for example, be tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide or butyltriphenylammonium hydroxide.

The amine type compound may, for example, be 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole or aminoquinoline.

The transesterification catalyst is used usually in an amount of from $1 \times 10^{-8}$ to $1 \times 10^{-5}$ mol per 1 mol of the aromatic dihydroxy compound, preferably from $1 \times 10^{-7}$ to $8 \times 10^{-6}$, particularly preferably from $3 \times 10^{-7}$ to $2 \times 10^{-6}$. If its amount is smaller than the above lower limit, polymerization activity required for production of a polycarbonate having a desired molecular weight can not be obtained, and if its amount is larger than the above range, the polymer hue tends to deteriorate, and the amount of foreign matters due to generation of gel tends to increase.

The transesterification reaction is carried out in a multistage process comprising at least two stages. Specifically, the reaction at the first stage is carried out at a temperature of from 140 to 260° C., preferably from 180 to 240° C. for from 0.1 to 10 hours, preferably from 0.5 to 3 hours. Then, the reaction temperature is increased while gradually lowering the pressure in the reaction system, and the polycondensation reaction is carried out under a reduced pressure of at most 133 Pa at a temperature of from 240 to 320° C. finally.

The manner of the reaction may be batch system, continuous system or a combination of the batch system and the continuous system, and the apparatus used may be in any form of a tank type, a tube type or a tower type.

Branched Aromatic Polycarbonate

The branched aromatic polycarbonate of the present invention is required to have a viscosity average molecular weight of at least 16,000. One having a viscosity average molecular weight less than 16,000 is not preferred since its mechanical strength such as impact strength tends to decrease. It is preferably at least 18,000 in view of mechanical strength. Further, it is preferably at most 60,000, more preferably at most 50,000 since the fluidity tends to be poor when the viscosity average molecular weight is significantly high.

Further, the amount of structural units of the following formula (1) contained in the main chain of the branched aromatic polycarbonate of the present invention is required to be within a range of from 2,000 to 50,000 wtppm, preferably from 3,000 to 10,000 wtppm, more preferably from 3,100 to 9,000 wtppm, particularly preferably from 3,100 to 8,000 wtppm:

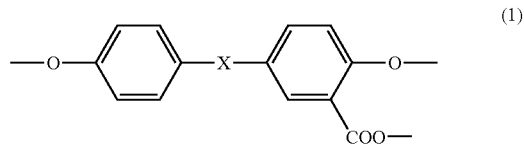

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —SO$_2$—. If the amount of the structural units of the formula (1) exceeds 50,000 wtppm, gel of the produced aromatic polycarbonate is likely to form, such being unfavorable, and further, the hue tends to deteriorate. On the other hand, if it is less than 2,000 wtppm, no intended melt properties by branching will be obtained.

Further, the amounts of the structural units of the following formulae (2) and (3) contained in the main chain of the branched aromatic polycarbonate of the present invention are preferably within a range of from 30 to 10,000 wtppm, more preferably from 30 to 5,000, particularly preferably from 40 to 4,000 wtppm, respectively:

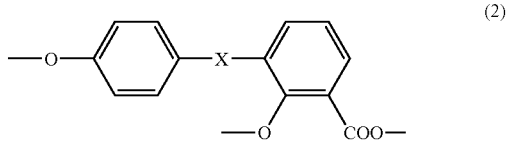

-continued

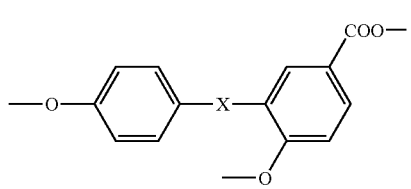
(3)

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —SO$_2$—. If the amounts of the structural units of the formulae (2) and (3) exceed 10,000 wtppm, branching tends to be too excessive, gelation tends to proceeds, whereby molding of the polymer tends to be difficult, such being unfavorable, and further, the hue tends to deteriorate. On the other hand, if they are less than 30 wtppm, fluidity under a high load will not increase, and no intended melt properties by branching will be obtained.

Further, in the present invention, usually structural units of the following formulae (4) and (5) are present in the main chain. Their total amount is preferably within a range of from 10 to 10,000 wtppm, more preferably from 10 to 3,000 wtppm, particularly preferably from 30 to 2,500 wtppm:

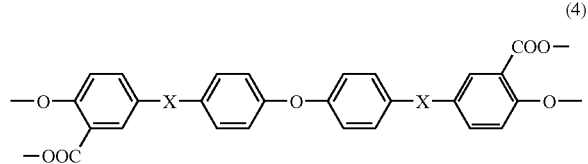
(4)

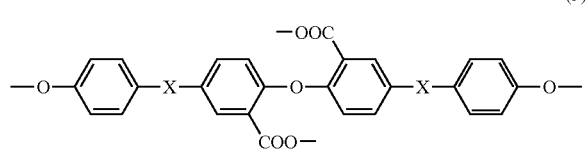
(5)

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —SO$_2$—. If the total amount of the structural units of the formulae (4) and (5) exceeds 10,000 wtppm, branching tends to be too excessive, gelation tends to proceed, and molding of the polymer tends to be difficult, such being unfavorable, and further, the hue tends to deteriorate. On other hand, if it is less than 10 wtppm, no melt properties by branching will be obtained.

The amounts of such heterogeneous structural units can readily be obtained by hydrolyzing the produced aromatic polycarbonate with an alkali, and subjecting it to e.g. high performance liquid chromatography (HPLC) or gel permeation chromatography (GPC), and the structural units of the above formulae (1) to (5) are detected as compounds of the following formulae (9) to (13), respectively, by high performance liquid chromatography (HPLC) after hydrolysis with an alkali:

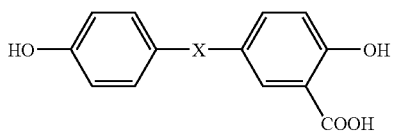
(9)

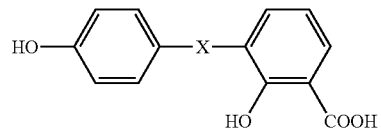
(10)

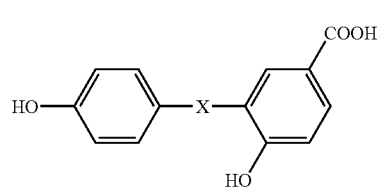
(11)

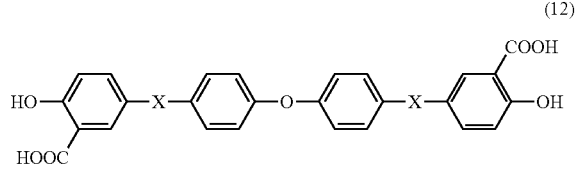
(12)

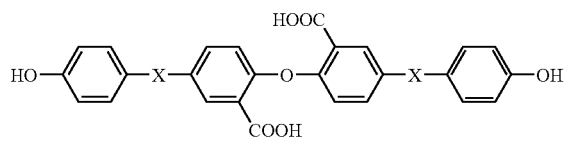
(13)

The structural units of the above formulae (1) to (5) are estimated to be due to heterogeneous structures produced as by-products mainly along with a transfer reaction or the like in the process for producing an aromatic polycarbonate by transesterification.

Selection of Aromatic Dihydroxy Compound

In order to obtain the above specific branched aromatic polycarbonate, it is important to select an appropriate material aromatic dihydroxy compound when a carboxylic acid diester and an aromatic dihydroxy compound are reacted to produce a branched aromatic polycarbonate.

Namely, an aromatic dihydroxy compound composed mainly of 4,4'-diphenol compound of the following formula (8) and containing a 2,4'-bisphenol compound of the following formula (6) (a compound having hydroxyl groups at 2-position of one aromatic ring and at 4-position of the other aromatic ring relative to the binding group X) in an appropriate amount is selected. In this case, the 2,4'-bisphenol compound of the following formula (6) may be added, or an aromatic dihydroxy compound such that the compound of the formula (6) formed as a by-product in the process for producing the 4,4'-diphenol compound of the following formula (8) is purified so that its amount will be a required amount at the time of purification and remained in an appropriate amount, may be employed. Among them, the latter method is simple and preferred since adjustment in production can be conducted:

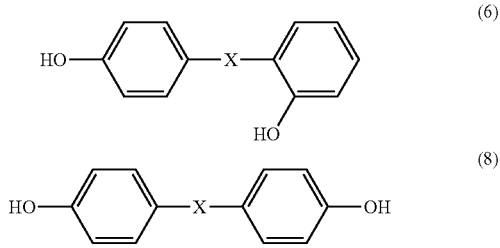

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —$SO_2$—.

Specific examples of the 2,4'-bisphenol compound of the formula (6) include 2,4'-dihydroxydiphenyl-1,1-methane, 2,4'-dihydroxydiphenyl-1,1-ethane, 2,4'-dihydroxydiphenyl-2,2-propane, 2,4'-dihydroxydiphenyl-2,2-butane, 2,4'-dihydroxydiphenyl-2,2-octane, 2,4'-dihydroxydiphenyl-1,1-cyclopentane, 2,4'-dihydroxydiphenyl-1,1-cyclohexane, 2,4'-dihydroxydiphenyl ether, 2,4'-dihydroxydiphenylsulfide, 2,4'-dihydroxydiphenylsulfoxide and 2,4'-dihydroxydiphenylsulfone.

The 2,4'-bisphenol compound to be remained varies depending upon the type of the material 4,4'-bisphenol compound, but in the case of bisphenol A, preferred is 2,4'-dihydroxydiphenyl-2,2-propane (hereinafter referred to as "2,4'-bisphenol A" or "2,4'-BPA").

As the method for producing an aromatic dihydroxy compound containing the 2,4'-bisphenol compound of the above formula (6), the following method may be mentioned.

For example, when phenol and acetone are reacted in the presence of an acid catalyst such as a strongly acidic ion exchange resin to produce bisphenol A, a reaction mixture containing 2,4'-bisphenol A as a by-product is obtained, and bisphenol A, 2,4'-bisphenol A and the like are purified and separated from the reaction mixture. Namely, an excess amount of phenol is added to the reaction mixture and dissolved, then the solution is cooled to precipitate an adduct (adduct crystals) comprising bisphenol A and phenol in a molar ratio of 1:1. The precipitated adduct crystals are separated from a mother liquor by e.g. filtration or centrifugal separation, and corresponding to the 2,4'-bisphenol compound to be remained, an operation of re-dissolution in e.g. phenol, crystallization and separation is repeatedly carried out to obtain bisphenol A with an intended purity.

The appropriate amount of the 2,4'-bisphenol compound to be remained varies depending upon the desired contents of the structural units of the formulae (1) to (3) contained in the main chain of the branched aromatic polycarbonate as the product, but experientially the amount of the 2,4'-bisphenol compound is usually within a range of from 100 to 50,000 wtppm, preferably from 100 to 10,000 wtppm, more preferably from 120 to 9,000 wtppm, particularly preferably from 150 to 8,000 wtppm, more preferably from 200 to 7,000 wtppm, furthermore preferably from 300 to 3,000 wtppm, based on the aromatic dihydroxy compound. If its amount is smaller than the above range, the degree of branching tends to be inadequate, whereby fluidity under a high load will not increase, and on the other hand, if its amount is too large, branching tends to proceed excessively, gelation tends to proceed, and molding of the polymer tends to be difficult, such being unfavorable.

The branched aromatic polycarbonate of the present invention is produced by transesterification, and it is thereby obtained accompanied by a partial transfer reaction during the polymerization reaction.

The transfer reaction is such a reaction that the carbonyl group forming the carbonic acid ester linkage transfers to the 2- or 4-position of the aromatic ring as shown in the following formula, and the structural units of the above formula (1) are formed from the structural units (A) derived from a 4,4'-bisphenol compound, and structural units of the above formula (2) or (3) are formed from the structural units (B) derived from a 2,4-bisphenol compound (provided that one molecular chain has a large number of structural units (B), and in such a case, a structure comprising both the units of the formulae (2) and (3) is obtained).

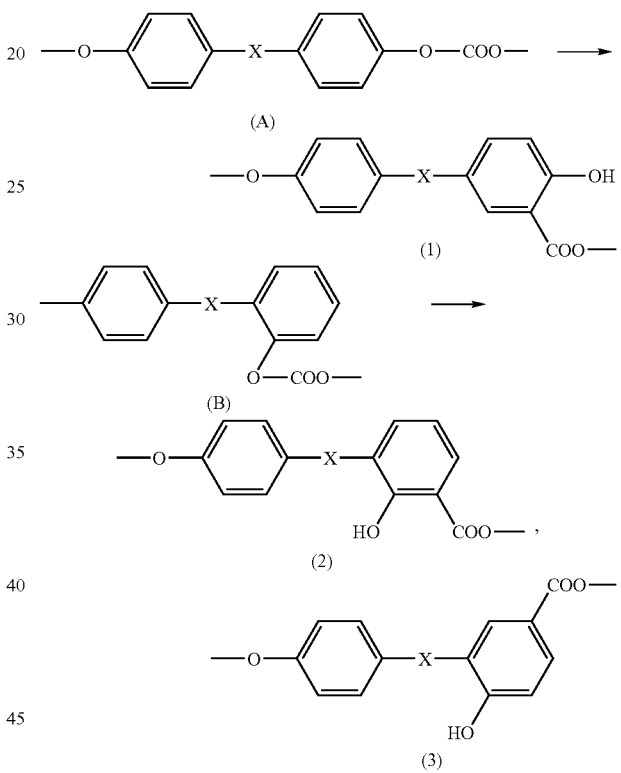

The degree of such a transfer reaction varies depending upon the polymerization reaction conditions, however, preferably, the amounts of the structural units of the above formulae (1), (2) and (3) will be appropriate particularly when the amount of the 2,4'-bisphenol compound is usually as defined above based on the aromatic dihydroxy compound, and the transesterification catalyst is used usually in an amount of from $1\times10^{-8}$ to $1\times10^{-5}$ mol, preferably from $1\times10^{-7}$ to $8\times10^{-6}$, particularly preferably from $3\times10^{-7}$ to $2\times10^{-6}$, per 1 mol of the aromatic dihydroxy compound.

To the aromatic polycarbonate of the present invention, a conventional additive such as a heat resistant stabilizer, an ultraviolet absorber, a releasing agent, a coloring agent, an antistatic agent, a slipping agent, an antiblocking agent, a lubricant, an anti-fogging agent, natural oil, synthetic oil, wax, an organic filler or an inorganic filler may be added. Such an additive may be added to a resin in a molten state, or it may be added after a once pelletized resin is re-melted.

EXAMPLES

Now, the present invention will be explained in detail with reference to Examples, however, the present invention is not limited to such specific Examples.

In the following Examples and Comparative Examples, analysis of bisphenol A used and the obtained aromatic polycarbonate was carried out by the following measuring methods.

(1) Amount of 2,4'-bisphenol A in Bisphenol A

Using high performance liquid chromatography (HPLC), measurement was carried out at a detection wavelength of 280 nm. The content was obtained from an analytical curve of 2,4'-bisphenol A.

(2) Contents of Structural Units of the Above Formulae (1) to (5)

1 g of the aromatic polycarbonate (sample) was dissolved in 100 ml of methylene chloride, 18 ml of a 28% sodium methoxide methanol solution and 80 ml of methanol were added thereto, and 25 ml of pure water was further added thereto, followed by stirring at room temperature for 2 hours for complete hydrolysis. Then, 1N hydrochloric acid was added thereto for neutralization, and a methylene chloride layer was separated to obtain a hydrolyzate.

0.05 g of the hydrolyzate was dissolved in 10 ml of acetonitrile, and measurement was carried out by using reverse high performance liquid chromatography (HPLC). In the reverse liquid chromatography, a mixed solvent comprising acetonitrile and a 10 mM ammonium acetate aqueous solution was used as an eluent, and the measurement was carried out under such a condition that the proportion of acetonitrile/10 mM ammonium acetate aqueous solution was 20/80 at the beginning and graded until 80/20, at a column temperature of 40° C., and a UV detector at a wavelength of 280 nm (manufactured by Shimadzu Corporation, SPD-6A) was employed for detection.

The structural units of the above formulae (1) to (5) are detected as compounds of the following formulae (14) to (18), and accordingly they were detected by using LC-MS (Agilent-1100) manufactured by Agilent and NMR (AL-400) manufactured by JEOL Ltd. Further, the contents of the respective structural units were calculated from the respective peak areas relative to the peak area of bisphenol A in a prepared analytical curve of bisphenol A.

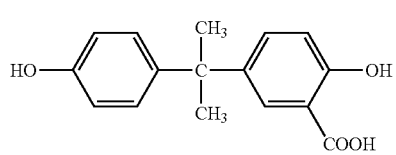
(14)

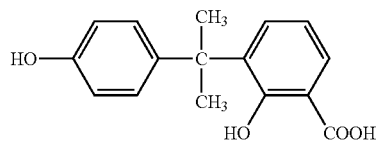
(15)

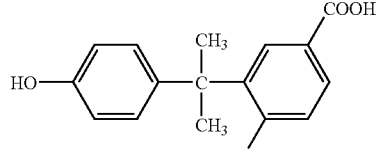
(16)

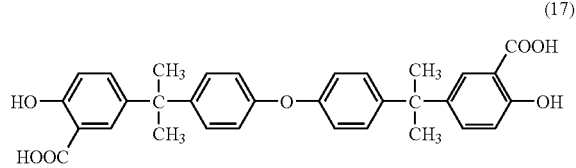
(17)

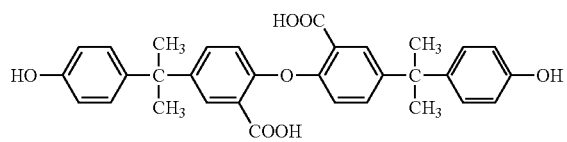
(18)

(3) Viscosity Average Molecular Weight

The intrinsic viscosity [η] of the aromatic polycarbonate (sample) in methylene chloride at 20° C. was measured by using a Ubbellohde viscometer, and obtained from the following formula:

$$[\eta]=1.23\times10^{-4}\times(MV)^{0.83}$$

(4) Hue (YI) and Residence Stability (Heat Resistant Hue YI)

A molded product was obtained from the aromatic polycarbonate (sample) by using an injection machine under the following conditions.

Tristimulus values XYZ as absolute values of color were measured by means of a color tester (SC-1-CH manufactured by SUGA TEST INSTRUMENTS Co., Ltd.) with respect to a press sheet in a size of 100 mm×100 mm×3 mm thickness, at 280° C. for YI measurement or at 360° C. at fifth shot with a residence of 10 minutes for residence stability measurement, and the YI value as an index of yellowness was calculated from the following relational expression:

$$YI=(100/Y)\times(1.28\times X-1.06\times Z)$$

The higher the YI value, the more the sample is colored.

(5) MI and Degree of Branching (MIR)

Sample weights (g) of the aromatic polycarbonate (sample) extruded at 260° C. for 10 minutes under loads of 21.6 kg and 2.16 kg, respectively, were measured in accordance with a method for testing melt mass flow rate (MFR) in JIS K7210, and taken as MI (21.6 kg) and MI (2.16 kg), respectively. The higher these values, the higher the fluidity.

Further, the degree of branching (MIR) is represented by the ratio of MI (21.6 kg)/MI (2.16 kg) as measured above. The higher this value, the higher the degree of branching.

Example 1

In accordance with a conventional method, phenol and acetone were reacted in the presence of a strongly acidic ion exchange resin, an excess amount of phenol was added to the obtained bisphenol A reaction mixture, and the reaction mixture was dissolved and then cooled to precipitate an adduct (adduct crystals) of bisphenol A and phenol. The precipitated adduct was separated from a mother liquor by filtration, and subjected to dissolution in phenol, precipitation and separation until bisphenol A containing 200 wtppm of 2,4'-bisphenol A was obtained.

Diphenyl carbonate and the obtained bisphenol A were mixed and prepared to a certain molar ratio (DPC/

BPA=1.040) in an atmosphere of nitrogen gas, and the obtained melt liquid was continuously supplied to a first vertical stirring polymerization tank having a capacity of 100 L, controlled to 220° C. and $1.33 \times 10^4$ Pa at a flow rate of 88.7 kg/hr through a material introduction tube, and the liquid level was kept constant while controlling the bulb aperture installed at the polymer discharge line at the bottom of the tank so that the average residence time would be 60 minutes. Further, a sodium hydroxide aqueous solution as the catalyst was continuously supplied in a proportion of $1.0 \times 10^{-6}$ mol per 1 mol of bisphenol A, simultaneously with initiation of supply of the above mixture.

The polymer liquid discharged at the bottom of the tank was sequentially and continuously supplied to second and third vertical stirring polymerization tanks having a capacity of 100 L and a fourth horizontal polymerization tank having a capacity of 150 L, and drawn out from the polymer discharge port at the bottom of the fourth polymerization tank. Then, the polymer in a molten state was introduced to a twin screw extruder, butyl p-toluene sulfonate (4 times the molar quantity of the cesium carbonate used as the catalyst) was continuously kneaded therewith, and the mixture was formed into a strand through a die and cut by a cutter to obtain pellets. The reaction conditions in the second to the fourth polymerization tanks were such that the second polymerization tank (240° C., $2.00 \times 10^3$ Pa, 75 rpm), third polymerization tank (270° C., 66.7 Pa, 75 rpm) and the fourth polymerization tank (275° C., 26.7 Pa, 5 rpm), respectively, and the conditions were set so that the temperature became high, the degree of vacuum became high and the stirring rate became low along with progress of the reaction. Further, the liquid level was controlled so that the average residence time would be 60 minutes in each of the second to fourth polymerization tanks during the reaction, and at the same time, phenol formed as a by-product was distilled off.

A polycarbonate having a viscosity average molecular weight of 24,400 was obtained, and the contents of the structural units of the above formulae (1) to (5), the hue (YI), the residence stability, MI and the degree of branching (MIR) were measured. The results are shown in Table 1.

Examples 2 and 3 and Comparative Example 1

Polymerization was carried out in the same manner as in Example 1 to produce an aromatic polycarbonate except that bisphenol A as identified in Table 1 was used. The results are shown in Table 1.

Comparative Example 2

Polymerization was carried out in the same manner as in Comparative Example 1 to produce an aromatic polycarbonate except that 1,1,1-tris(4-hydroxylphenyl)ethane (THPE) as a branching agent was added in an amount of 0.3 mol % to bisphenol A. The results are shown in Table 1.

TABLE 1

|  | Ex. 1 | Ex. 2 | Ex. 3 | Comp. Ex. 1 | Comp. Ex. 2 |
|---|---|---|---|---|---|
| Amount of 2,4'-bisphenol A in bisphenol A | 200 | 500 | 1,000 | 80 | 80 |
| Content of structural units of the formula (1) | 3,200 | 4,000 | 5,400 | 600 | 600 |
| Content of structural units of the formula (2) | 40 | 120 | 200 | 5 | 5 |
| Content of structural units of the formula (3) | 60 | 150 | 320 | 10 | 10 |
| Total content of structural units of formulae (4) and (5) | 100 | 520 | 1,040 | 3 | 3 |
| Mv | 24,400 | 24,500 | 24,500 | 24,200 | 24,300 |
| YI | 1.6 | 1.7 | 1.8 | 1.7 | 3.1 |
| Residence stability | 6.7 | 6.8 | 6.9 | 6.6 | 12.5 |
| MI (21.6 kg) | 18.2 | 20.6 | 22.2 | 10.2 | 8.1 |
| MI (2.16 kg) | 0.9 | 0.9 | 0.9 | 0.8 | 0.5 |
| Degree of branching: MIR | 20.2 | 22.9 | 24.7 | 12.8 | 16.2 |

According to the present invention, an aromatic polycarbonate has improved fluidity under a high load, and has a favorable hue, and accordingly it is suitable for processing by extrusion and injection molding, particularly for application as a hollow part and a large panel by blow molding which requires a material having a high melt strength and excellent shape-holding properties of an extruded product.

The entire disclosure of Japanese Patent Application No. 2001-29951 filed on Feb. 6, 2001 including specification, claims and summary is incorporated herein by reference in its entirety.

What is claimed is:

1. A branched aromatic polycarbonate produced by transesterification and having a viscosity average molecular weight of at least 16,000, wherein the amount of structural units of the following formula (1) contained in its main chain is within a range of from 2,000 to 50,000 wtppm, and the amounts of structural units of the following formulae (2) and (3) contained in its main chain are within a range of from 30 to 10,000 wtppm, respectively:

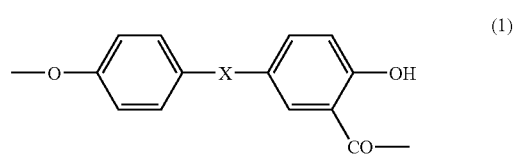

(1)

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —SO$_2$—,

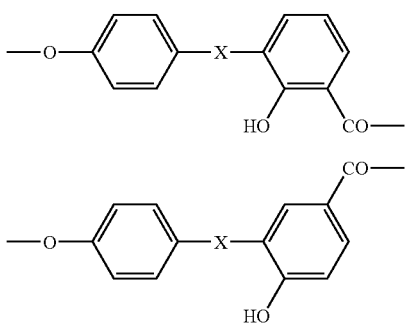
(2)

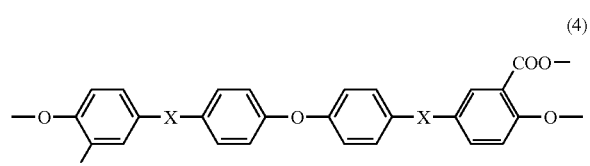
(3)

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —SO$_2$—;

wherein the total amount of structural units of the following formulae (4) and (5) contained in its main chain is within a range of from 10 to 10,000 wtppm:

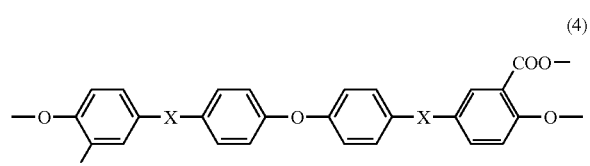
(4)

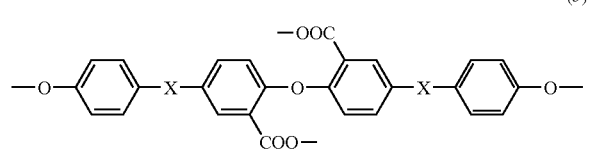
(5)

wherein X is a single bond, a $C_{1-8}$ alkylene group, a $C_{2-8}$ alkylidene group, a $C_{5-15}$ cycloalkylene group, a $C_{5-15}$ cycloatkylidene group or a member selected from bivalent groups represented by —O—, —S—, —CO—, —SO— and —SO$_2$—.

2. The branched aromatic polycarbonate according to claim 1, wherein the amount of the structural units of the formula (1) contained in its main chain is within a range of from 3,000 to 10,000 wtppm.

3. The branched aromatic polycarbonate according to claim 1, wherein the amounts of the structural units of the formulae (2) and (3) contained in its main chain are within a range of from 30 to 5,000 wtppm, respectively.

4. The branched aromatic polycarbonate according to claim 1, wherein the total amount of the structural units of the formulae (4) and (5) contained in its main chain is within a range of from 10 to 3,000 wtppm.

5. The branched aromatic polycarbonate according to claim 1, wherein the viscosity average molecular weight is at least 18,000.

6. A method for producing the branched aromatic polycarbonate as defined in claim 1, which comprises reacting a carbonic acid diester with an aromatic dihydroxy compound to produce an aromatic polycarbonate, wherein an aromatic dihydroxy compound containing a 2,4'-bisphenol compound of the following formula (6) in an amount of from 100 to 50,000 wtppm is used:

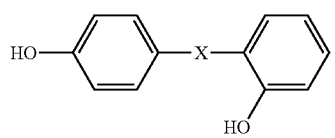
(6)

wherein X is a single bond, a $C_{1-8}$ ailcylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —SO$_2$—.

7. The method for producing the branched aromatic polycarbonate according to claim 6, wherein the 2,4'-bisphenol compound is 2,4'-dihydroxydiphenyl-2,2-propane.

8. The method for producing the branched aromatic polycarbonate according to claim 6, wherein the aromatic dihydroxy compound containing the 2,4'-bisphenol compound in an amount of from 100 to 10,000 wtppm is used.

9. The method for producing the branched aromatic polycarbonate according to claim 6, wherein the carbonic acid diester is diphenyl carbonate.

10. The method for producing the branched aromatic polycarbonate according to claim 6, wherein the aromatic dihydroxy compound is 2,2-bis(4-hydroxyphenyl)propane.

11. The method for producing the branched aromatic polycarbonate according to claim 6, wherein when the carbonic acid diester is reacted with the aromatic dihydroxy compound to produce an aromatic polycarbonate, an alkali metal compound and/or an alkaline earth metal compound is used as a transesterification catalyst.

12. The method for producing the branched aromatic polycarbonate according to claim 11, wherein the amount of the alkali metal compound and/or the alkaline earth metal compound is from $1 \times 10^{-8}$ to $1 \times 10^{-5}$ per 1 mol of the aromatic dihydroxy compound.

13. A branched aromatic polycarbonate produced by transesterification and having a viscosity average molecular weight of at least 16,000, wherein the amount of structural units of the following formula (1) contained in its main chain is within a range of from 3,000 to 10,000 wtppm, and the amounts of structural units of the following formulae (2) and (3) contained in its main chain are within a range of from 30 to 10,000 wtppm, respectively:

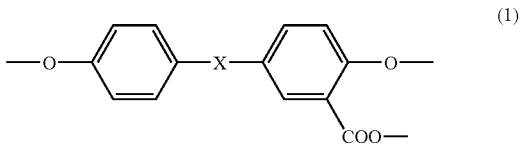
(1)

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —SO$_2$—,

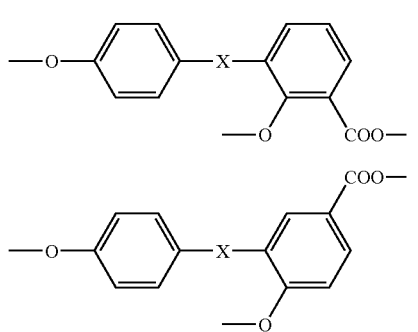

(2)

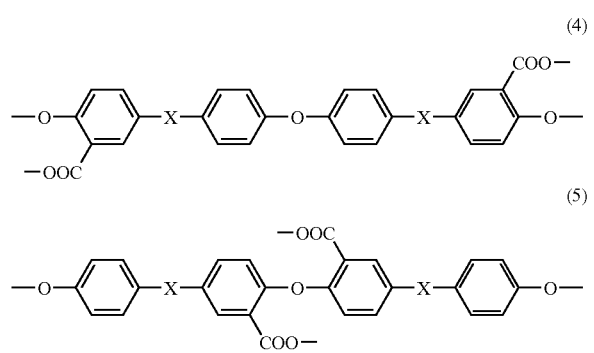

(3)

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —$SO_2$—.

14. The branched aromatic polycarbonate according to claim 13, wherein the total amount of structural units of the following formulae (4) and (5) contained in its main chain is within a range of from 10 to 10,000 wtppm:

(4)

(5)

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —$SO_2$—.

15. The branched aromatic polycarbonate according to claim 13, wherein the amounts of the structural units of the formulae (2) and (3) contained in its main chain are within a range of from 30 to 5,000 wtppm, respectively.

16. The branched aromatic polycarbonate according to claim 14, wherein the total amount of the structural units of the formulae (4) and (5) contained in its main chain is within a range of from 10 to 3,000 wtppm.

17. The branched aromatic polycarbonate according to claim 13, wherein the viscosity average molecular weight is at least 18,000.

18. A method for producing the branched aromatic polycarbonate as defined in claim 13, which comprises reacting a carbonic acid diester with an aromatic dihydroxy compound to produce an aromatic polycarbonate, wherein an aromatic dihydroxy compound containing a 2,4'-bisphenol compound of the following formula (6) in an amount of from 100 to 50,000 wtppm is used:

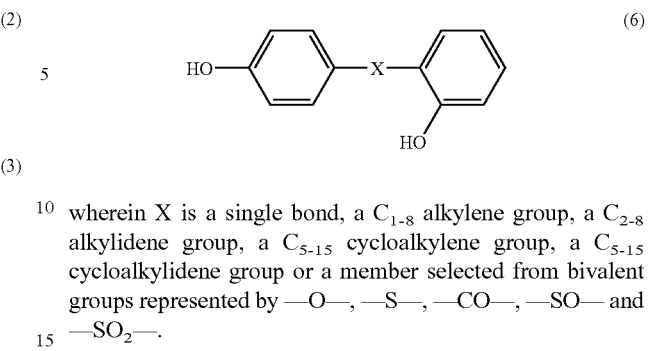

(6)

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —$SO_2$—.

19. The method for producing the branched aromatic polycarbonate according to claim 18, wherein the 2,4'-bisphenol compound is 2,4'-dihydroxydiphenyl-2,2-propane.

20. The method for producing the branched aromatic polycarbonate according to claim 18, wherein the aromatic dihydroxy compound containing the 2,4'-bisphenol compound in an amount of from 100 to 10,000 wtppm is used.

21. The method for producing the branched aromatic polycarbonate according to claim 18, wherein the carbonic acid diester is diphenyl carbonate.

22. The method for producing the branched aromatic polycarbonate according to claim 18, wherein the aromatic dihydroxy compound is 2,2-bis(4-hydroxyphenyl)propane.

23. The method for producing the branched aromatic polycarbonate according to claim 18, wherein when the carbonic acid diester is reacted with the aromatic dihydroxy compound to produce an aromatic polycarbonate, an alkali metal compound and/or an alkaline earth metal compound is used as a transesterification catalyst.

24. The method for producing the branched aromatic polycarbonate according to claim 23, wherein the amount of the alkali metal compound and/or the alkaline earth metal compound is from $1 \times 10^{-8}$ to $1 \times 10^{-5}$ per 1 mol of the aromatic dihydroxy compound.

25. A branched aromatic polycarbonate produced by transesterification and having a viscosity average molecular weight of at least 16,000, wherein the amount of structural units of the following formula (1) contained in its main chain is within a range of from 2,000 to 50,000 wtppm, and the amounts of structural units of the following formulae (2) and (3) contained in its main chain are within a range of from 30 to 5,000 wtppm, respectively:

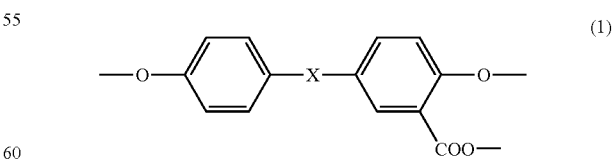

(1)

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —$SO_2$—,

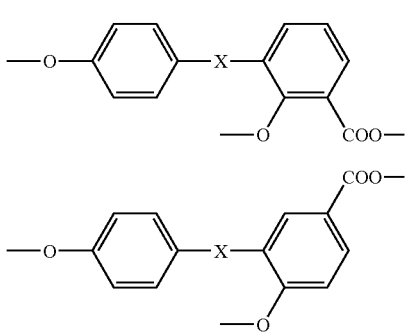

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —$SO_2$—.

26. The branched aromatic polycarbonate according to claim 25, wherein the total amount of structural units of the following formulae (4) and (5) contained in its main chain is within a range of from 10 to 10,000 wtppm:

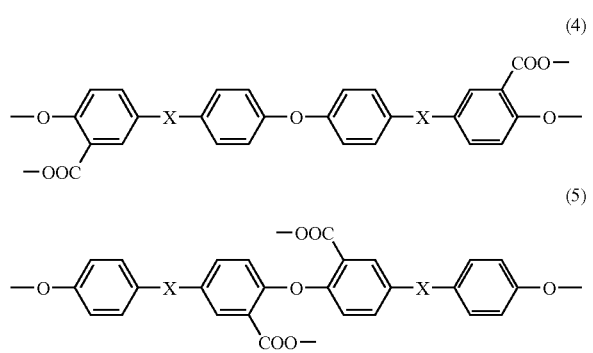

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —$SO_2$—.

27. The branched aromatic polycarbonate according to claim 25, wherein the amount of the structural units of the formula (1) contained in its main chain is within a range of from 3,000 to 10,000 wtppm.

28. The branched aromatic polycarbonate according to claim 26, wherein the total amount of the structural units of the formulae (4) and (5) contained in its main chain is within a range of from 10 to 3,000 wtppm.

29. The branched aromatic polycarbonate according to claim 25, wherein the viscosity average molecular weight is at least 18,000.

30. A method for producing the branched aromatic polycarbonate as defined in claim 25, which comprises reacting a carbonic acid diester with an aromatic dihydroxy compound to produce an aromatic polycarbonate, wherein an aromatic dihydroxy compound containing a 2,4'-bisphenol compound of the following formula (6) in an amount of from 100 to 50,000 wtppm is used:

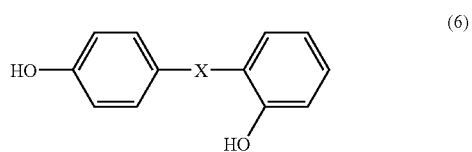

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —$SO_2$—.

31. The method for producing the branched aromatic polycarbonate according to claim 30, wherein the 2,4'-bisphenol compound is 2,4'-dihydroxydiphenyl-2,2-propane.

32. The method for producing the branched aromatic polycarbonate according to claim 30, wherein the aromatic dihydroxy compound containing the 2,4'-bisphenol compound in an amount of from 100 to 10,000 wtppm is used.

33. The method for producing the branched aromatic polycarbonate according to claim 30, wherein the carbonic acid diester is diphenyl carbonate.

34. The method for producing the branched aromatic polycarbonate according to claim 30, wherein the aromatic dihydroxy compound is 2,2-bis(4-hydroxyphenyl)propane.

35. The method for producing the branched aromatic polycarbonate according to claim 30, wherein when the carbonic acid diester is reacted with the aromatic dihydroxy compound to produce an aromatic polycarbonate, an alkali metal compound and/or an alkaline earth metal compound is used as a transesterification catalyst.

36. The method for producing the branched aromatic polycarbonate according to claim 35, wherein the amount of the alkali metal compound and/or the alkaline earth metal compound is from $1\times10^{-8}$ to $1\times10^{-5}$ per 1 mol of the aromatic dihydroxy compound.

37. A branched aromatic polycarbonate produced by transesterification and having a viscosity average molecular weight of at least 18,000, wherein the amount of structural units of the following formula (1) contained in its main chain is within a range of from 2,000 to 50,000 wtppm, and the amounts of structural units of the following formulae (2) and (3) contained in its main chain are within a range of from 30 to 10,000 wtppm, respectively:

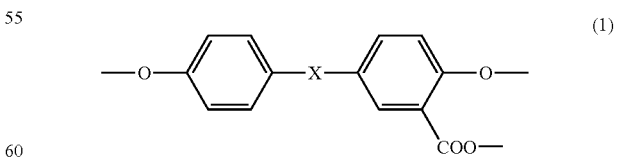

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —$SO_2$—,

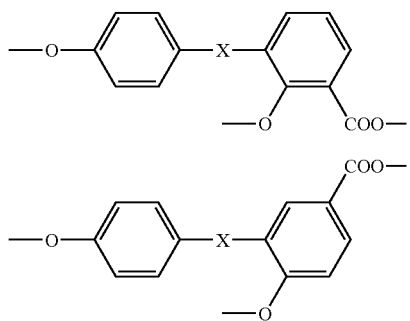

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —$SO_2$—.

38. The branched aromatic polycarbonate according to claim 37, wherein the total amount of structural units of the following formulae (4) and (5) contained in its main chain is within a range of from 10 to 10,000 wtppm:

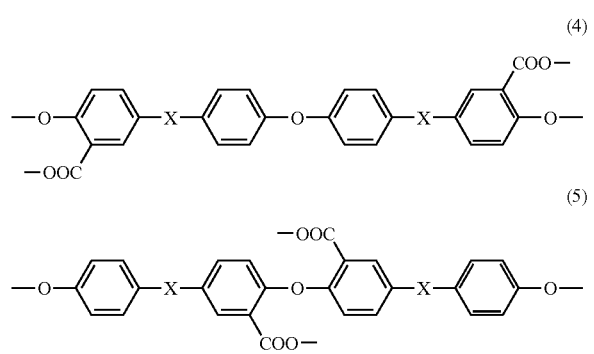

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —$SO_2$—.

39. The branched aromatic polycarbonate according to claim 37, wherein the amount of the structural units of the formula (1) contained in its main chain is within a range of from 3,000 to 10,000 wtppm.

40. The branched aromatic polycarbonate according to claim 37, wherein the amounts of the structural units of the formulae (2) and (3) contained in its main chain are within a range of from 30 to 5,000 wtppm, respectively.

41. The branched aromatic polycarbonate according to claim 38, wherein the total amount of the structural units of the formulae (4) and (5) contained in its main chain is within a range of from 10 to 3,000 wtppm.

42. A method for producing the branched aromatic polycarbonate as defined in claim 37, which comprises reacting a carbonic acid diester with an aromatic dihydroxy compound to produce an aromatic polycarbonate, wherein an aromatic dihydroxy compound containing a 2,4'-bisphenol compound of the following formula (6) in an amount of from 100 to 50,000 wtppm is used:

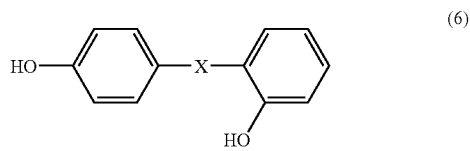

wherein X is a single bond, a $C_{1-8}$ alkylene group, a $C_{2-8}$ alkylidene group, a $C_{5-15}$ cycloalkylene group, a $C_{5-15}$ cycloalkylidene group or a member selected from bivalent groups represented by —O—, —S—, —CO—, —SO— and —$SO_2$—.

43. The method for producing the branched aromatic polycarbonate according to claim 42, wherein the 2,4'-bisphenol compound is 2,4'-dihydroxydiphenyl-2,2-propane.

44. The method for producing the branched aromatic polycarbonate according to claim 42, wherein the aromatic dihydroxy compound containing the 2,4'-bisphenol compound in an amount of from 100 to 10,000 wtppm is used.

45. The method for producing the branched aromatic polycarbonate according to claim 42, wherein the carbonic acid diester is diphenyl carbonate.

46. The method for producing the branched aromatic polycarbonate according to claim 37, wherein the aromatic dihydroxy compound is 2,2-bis(4-hydroxyphenyl)propane.

47. The method for producing the branched aromatic polycarbonate according to claim 37, wherein when the carbonic acid diester is reacted with the aromatic dihydroxy compound to produce an aromatic polycarbonate, an alkali metal compound and/or an alkaline earth metal compound is used as a transesterification catalyst.

48. The method for producing the branched aromatic polycarbonate according to claim 37, wherein the amount of the alkali metal compound and/or the alkaline earth metal compound is from $1\times10^{-8}$ to $1\times10^{-5}$ per 1 mol of the aromatic dihydroxy compound.

* * * * *